United States Patent
Jeon et al.

(10) Patent No.: US 11,226,838 B2
(45) Date of Patent: Jan. 18, 2022

(54) CONTAINER-BASED MANAGEMENT METHOD BY CHANGING INTELLIGENT CONTAINER COMPONENT EXECUTION PRIORITY USING REMOTE CALLS VIA REMOTE ACCESS UNIT AND REMOTE NETWORK FUNCTON MODULE

(71) Applicant: Korea electronics technology institute, Seongnam-si (KR)

(72) Inventors: Ki Man Jeon, Seongnam-si (KR); Jae Gi Son, Yongin-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 115 days.

(21) Appl. No.: 16/232,580

(22) Filed: Dec. 26, 2018

(65) Prior Publication Data
US 2020/0210217 A1 Jul. 2, 2020

(51) Int. Cl.
*G06F 9/455* (2018.01)
*G06F 8/61* (2018.01)
*H04L 29/08* (2006.01)
*G06F 9/48* (2006.01)
*G06F 9/54* (2006.01)
*G06N 20/00* (2019.01)
*G06F 9/445* (2018.01)

(52) U.S. Cl.
CPC .......... *G06F 9/45558* (2013.01); *G06F 8/63* (2013.01); *G06F 9/44505* (2013.01); *G06F 9/4881* (2013.01); *G06F 9/548* (2013.01); *G06N 20/00* (2019.01); *H04L 67/322* (2013.01); *H04L 67/34* (2013.01); *G06F 8/61* (2013.01); *G06F 9/547* (2013.01); *G06F 2009/45562* (2013.01)

(58) Field of Classification Search
CPC ...... G06F 9/45558; G06F 8/63; G06F 9/4881; G06F 9/548; G06F 9/44505; G06F 2009/45562; G06F 8/61; G06F 9/547; H04L 67/34; H04L 67/322; G06N 20/00
See application file for complete search history.

(56) References Cited

U.S. PATENT DOCUMENTS

| | | | |
|---|---|---|---|
| 9,367,305 B1* | 6/2016 | Kumar | G06F 8/71 |
| 10,063,469 B2* | 8/2018 | Shen | H04L 41/0893 |
| 2004/0034856 A1* | 2/2004 | Boudnik | G06F 9/5027 718/103 |
| 2008/0127234 A1* | 5/2008 | Hesmer | G06F 9/547 719/330 |

(Continued)

OTHER PUBLICATIONS

Microsoft Computer Dictionary, Fifth Edition. p. 287. (Year: 2002).*

(Continued)

*Primary Examiner* — Michael W Ayers
(74) *Attorney, Agent, or Firm* — Hauptman Ham, LLP (57) ABSTRACT

A method for managing AI components installed in containers is provided. The container-based component management method creates a container, installs at least one selected from a plurality of components in the container, and manages the components installed in the container. Accordingly, the execution priorities of the AI components installed in the containers can be managed and operated, such that degradation of system performance and frequent error occurrence can be prevented.

3 Claims, 8 Drawing Sheets

(56) References Cited

U.S. PATENT DOCUMENTS

| | | | |
|---|---|---|---|
| 2008/0295110 A1* | 11/2008 | Muscarella | G06F 9/54 |
| | | | 719/311 |
| 2015/0256481 A1* | 9/2015 | Turovsky | H04L 67/10 |
| | | | 709/226 |
| 2016/0098285 A1 | 4/2016 | Davis et al. | |
| 2016/0378518 A1* | 12/2016 | Antony | G06F 9/4856 |
| | | | 718/1 |
| 2017/0206073 A1* | 7/2017 | Kirkpatrick | H04L 67/34 |
| 2017/0262355 A1 | 9/2017 | Liu et al. | |
| 2018/0082053 A1* | 3/2018 | Brown | G06F 21/44 |
| 2018/0109469 A1* | 4/2018 | Nakazawa | H04L 47/821 |

OTHER PUBLICATIONS

Korean Office Action dated Apr. 14, 2021, in connection with the Korean Patent Application No. 10-2017-0156494.
Korean Office Action dated Apr. 14, 2021, in connection with the Korean Patent Application No. 10-2017-0156496.

* cited by examiner

CONTAINER-BASED MANAGEMENT METHOD BY CHANGING INTELLIGENT CONTAINER COMPONENT EXECUTION PRIORITY USING REMOTE CALLS VIA REMOTE ACCESS UNIT AND REMOTE NETWORK FUNCTON MODULE

TECHNICAL FIELD OF THE INVENTION

The present disclosure relates generally to virtualization technology for distributing computing resources to users, and more particularly, to container-based virtualization technology for providing a virtual environment which has an independent operating system mounted therein and adopting a process execution method.

BACKGROUND OF THE INVENTION

Container-based virtualization technology capable of overcoming the shortcomings of existing virtual machines, which require high-capacity memory regions and high central processing unit (CPU) performance, supports user services by executing a processor in the space of a network, a CPU, a memory, and a disk which are isolated from one another. Therefore, there are advantages of enhanced execution speed and minimized use of computing resources.

However, when an internal function for implementing software (SW) is designed, the processor is normally assigned a differential order over the operating system, and performs functions. Therefore, there is a risk that, when an error occurs, all of the functions stop.

In particular, when artificial intelligent (AI) components providing enhanced functions are standardized and are applied to a design system, there may be difficulty in smoothly interacting with a manager without degrading system performance.

In addition, such container-based virtualization technology requires network abstraction in a host operating system. However, current local network abstraction techniques have a limit to performing a function related to calling of an internal program of a container at a remote distance.

Accordingly, there is a demand for a method for calling an internal program of a container at a remote distance.

SUMMARY OF THE INVENTION

To address the above-discussed deficiencies of the prior art, it is a primary object of the present disclosure to provide a method for managing execution priorities of AI components installed in containers.

In addition, another object of the present disclosure is to provide a method for calling an internal program of a container at a remote distance.

According to an embodiment of the present disclosure to achieve the above-described objects, a container-based component management method includes: a first creation step of creating a first container; a first installation step of installing at least one selected from a plurality of components in the first container; and a first management step of managing the components installed in the first container.

The first management step may include managing execution priorities of the components installed in the first container.

The method according to the present embodiment may further include: a second creation step of creating a second container; and a second installation step of installing at least one selected from a plurality of components in the second container.

The method according to the present embodiment may further include a second management step of managing the components installed in the second container.

The second management step may include managing execution priorities of the components installed in the second container.

The first management step may be performed by a manager provided in a docker which performs the first creation step and the first installation step.

The docker may further perform the second creation step and the second installation step, and the manager may further perform the second management step.

The method according to the present embodiment may further include a first calling step of remotely calling a component installed in the first container.

The first calling step may include remotely calling the component installed in the first container through a first remote access unit installed in the first container.

The first calling step may include accessing the first remote access unit through a remote network function module installed in a local network abstraction module.

The method according to the present embodiment may further include: a second creation step of creating a second container; and a second calling step of remotely calling a component installed in the second container.

The second calling step may include remotely calling the component installed in the second container through a second remote access unit installed in the second container.

The second calling step may include accessing the second remote access unit through a remote network function module installed in a local network abstraction module.

The calling may be for editing the component.

According to another embodiment of the present disclosure, a virtualization system includes: a docker configured to create a first container; and a manager configured to install at least one selected from a plurality of components in the first container, and to manage the components installed in the first container.

According to embodiments of the present disclosure as described above, the execution priorities of the AI components installed in the containers can be managed and operated, such that degradation of system performance and frequent error occurrence can be prevented.

In addition, according to embodiments of the present disclosure, the internal program of the container can be remotely called, such that the function of the component can be modified or edited at a remote distance in the container-based virtualization system.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Hereinafter, the present disclosure will be described in detail with reference to the accompanying drawings.

Figure 1:
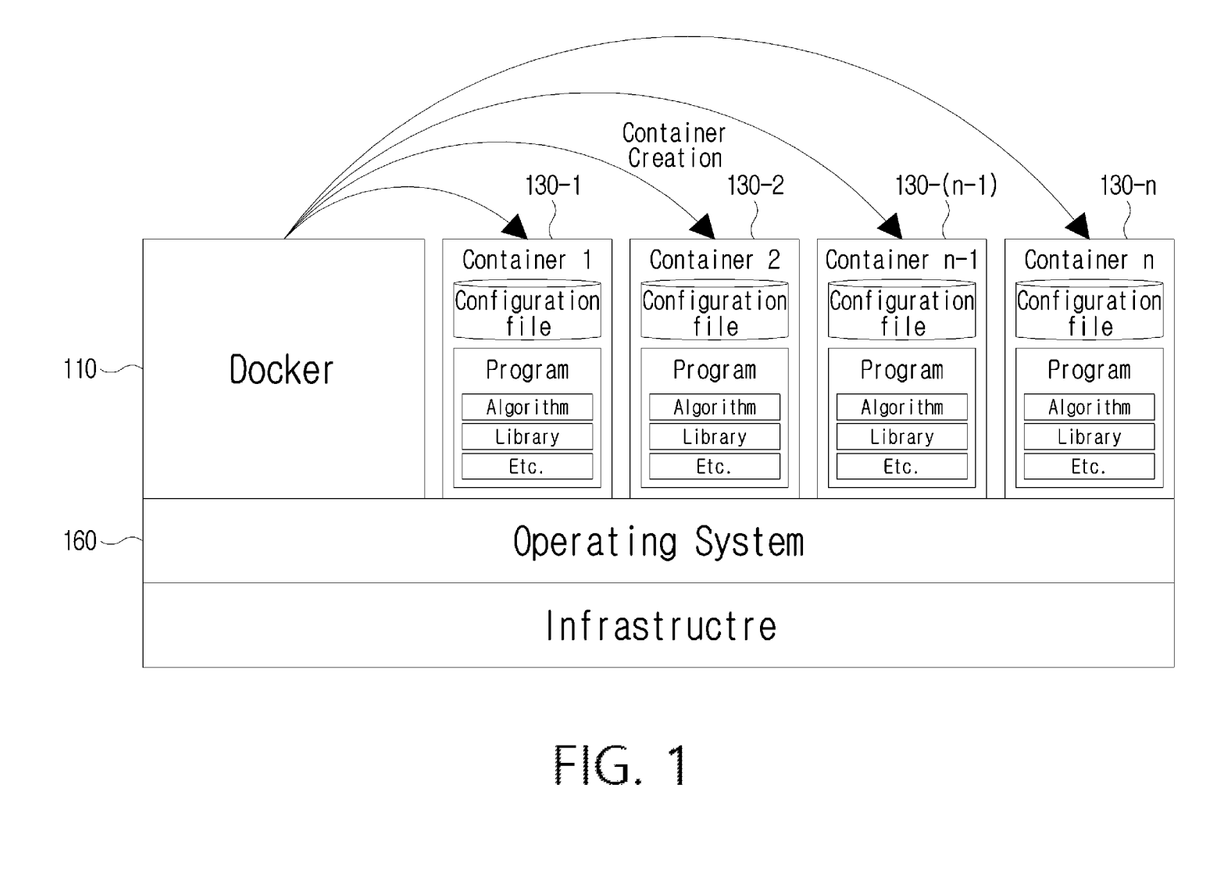
FIG. 1 is a view illustrating a structure of a container-based virtualization system.

FIG. 1 is a view illustrating a structure of a container-based virtualization system. Container-based virtualization provides a virtual environment of a process execution method which is differentiated from the concept of a virtual machine having an independent operating system mounted therein. Accordingly, in a distributed computing environment such as a cloud infrastructure, stability and security of the system can be further enhanced.

The container-based virtualization system refers to a structure in which a docker 110 and containers 130-1, 130-2, 130-($n$-1), and 130-$n$ are created in a superordinate layer of an operating system 160.

The docker 110 creates the containers 130-1, 130-2, 130-($n$-1), and 130-$n$ with resources isolated according to users, and the containers 130-1, 130-2, 130-($n$-1), and 130-$n$ have their required internal programs installed therein, respectively.

The internal programs installed in the containers 130-1, 130-2, 130-($n$-1), and 130-$n$ indicate AI components which are AI programs independently operated to implement AI functions capable of performing a plug-and-play.

The AI component refers to a program that has various AI functions, such as machine learning, interaction, emotion recognition, or the like, integrated into a component.

Hereinafter, a method in which the docker 110 installs AI components in the containers 130-1, 130-2, 130-($n$-1), and 130-$n$, and manages the same will be described in detail with reference to FIGS. 2 and 3.

Figure 2:
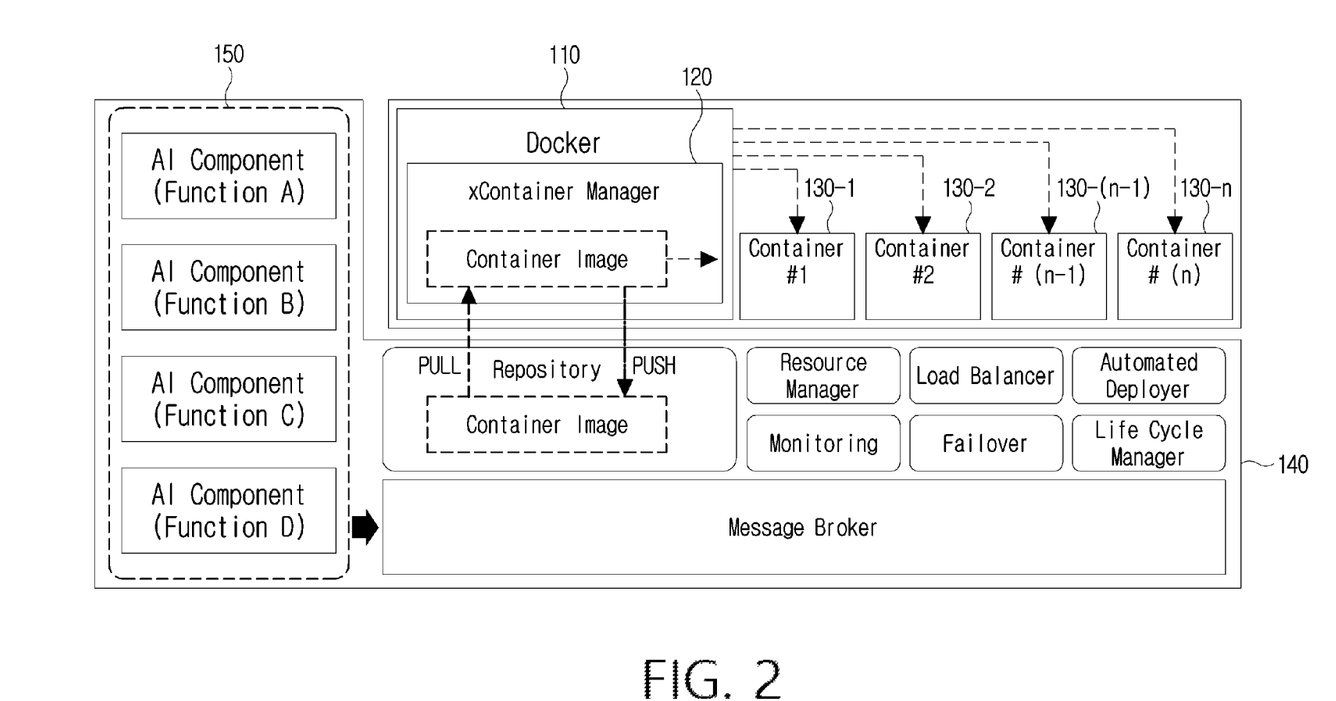
FIG. 2 is a view provided to explain a container-based AI component installation method according to an embodiment of the present disclosure.

FIG. 2 is a view provided to explain a container-based AI component installation method according to an embodiment of the present disclosure.

As shown in FIG. 2, the docker 110 may include a container manager 120. The container manager 120 installs AI components in the containers 130-1, 130-2, 130-($n$-1), and 130-$n$.

Specifically, a component interface 140 selects at least one of pre-created/stored AI components 150, and generates an image, and the container manager 120 receives the image from the component interface 140 and installs the image in a corresponding container. Accordingly, an internal program of the corresponding container may be driven.

Figure 3:
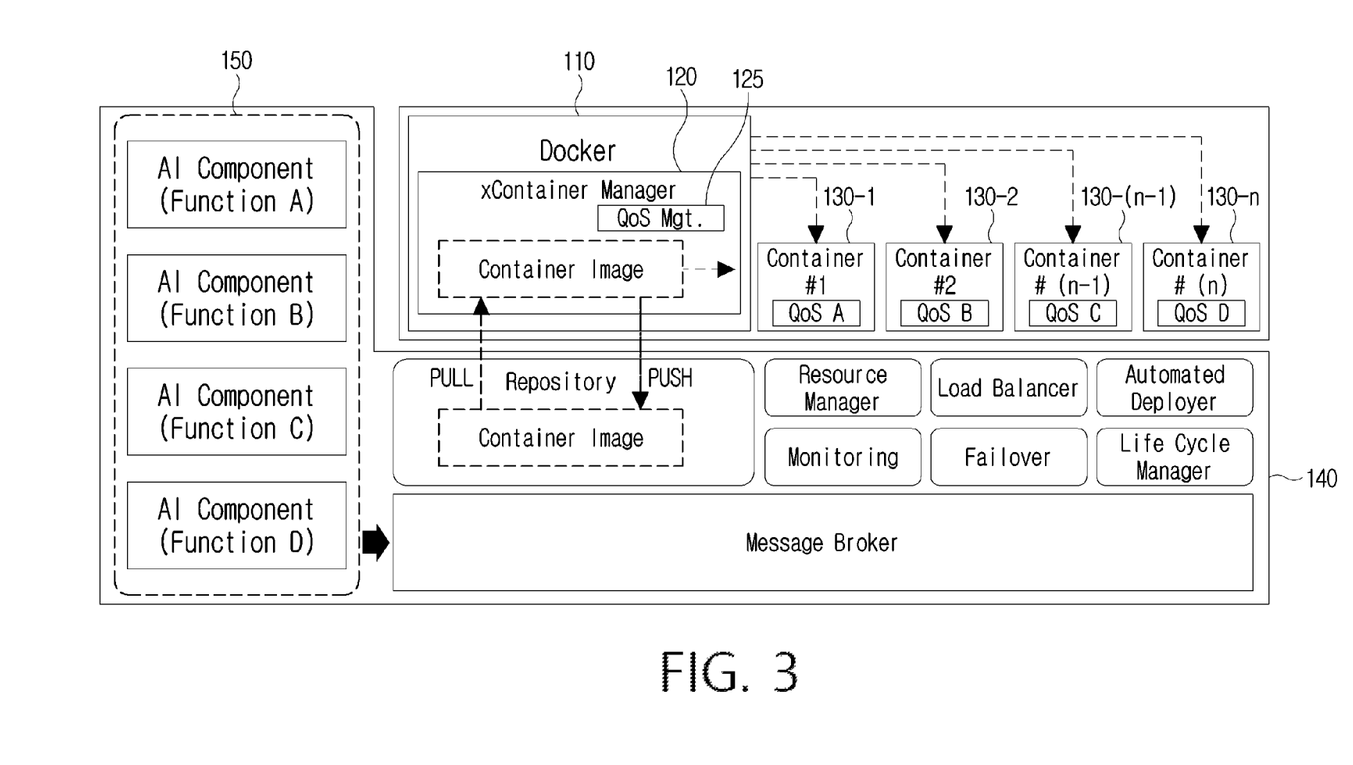
FIG. 3 is a view provided to explain a container-based AI component management method according to another embodiment of the present disclosure.

FIG. 3 is a view provided to explain a container-based AI component management method according to another embodiment of the present disclosure.

As shown in FIG. 3, the container manager 120 includes a QoS manager 125. The QoS manager 125 sets execution priorities of the AI components installed in the containers 130-1, 130-2, 130-($n$-1), and 130-$n$, and transmits the set execution priority information to the containers 130-1, 130-2, 130-($n$-1), and 130-$n$.

The execution priorities of the AI components may vary according to the containers 130-1, 130-2, 130-($n$-1), and 130-$n$.

The containers 130-1, 130-2, 130-($n$-1), and 130-$n$ retain the execution priority information provided from the QoS manager 125, operate the AI components according to the priority information, and maximize driving efficiency of the AI components, and eventually, realize performance optimization of the AI components in a virtual environment.

Figure 4:
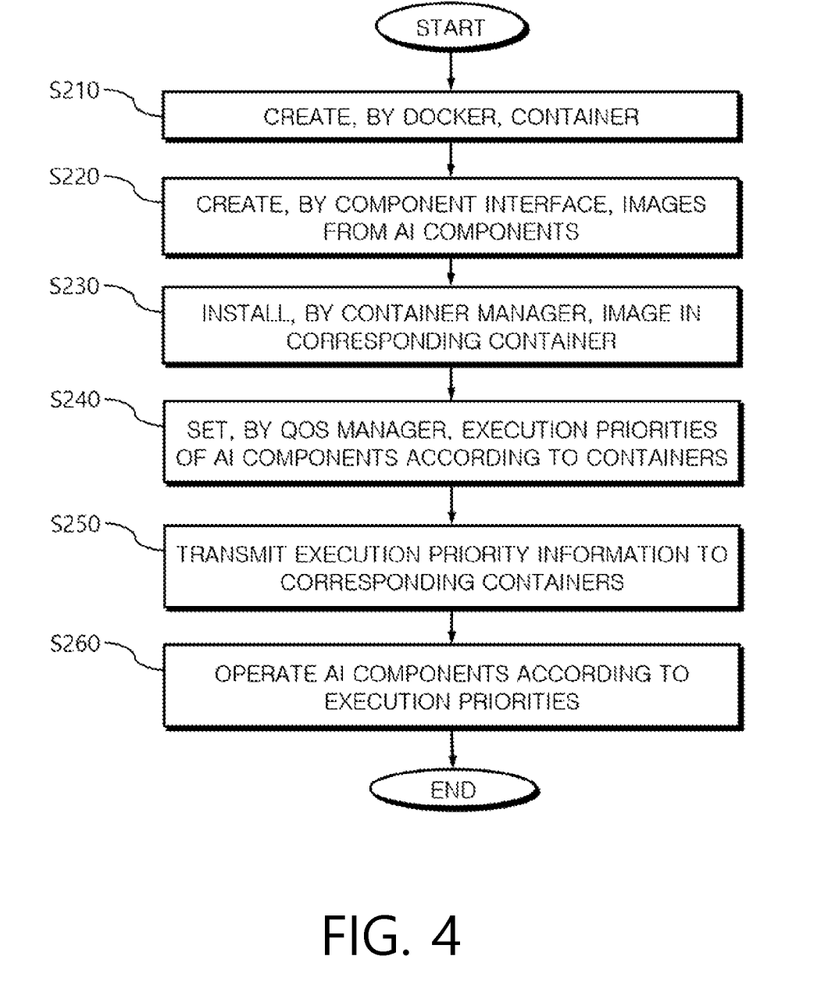
FIG. 4 is a flowchart provided to explain a container-based AI component installation/management method according to still another embodiment of the present disclosure.

FIG. 4 is a flowchart provided to explain a container-based AI component installation/management method according to still another embodiment of the present disclosure.

As shown in FIG. 4, the docker 110 creates a container (S210), and the container manager 120 receives an image which is created by the component interface 140 selecting at least one of the pre-created/stored AI components 150 (S220), and installs the image in a corresponding container (S230).

Next, the QoS manager 125 of the container manager 120 sets execution priorities of the AI components installed in the containers 130-1, 130-2, 130-($n$-1), and 130-$n$ (S240), and transmits the set execution priority information to the containers 130-1, 130-2, 130-($n$-1), and 130-$n$ (S250).

Accordingly, the containers 130-1, 130-2, 130-($n$-1), and 130-$n$ operate the AI components according to the execution priorities (S260).

The container-based AI component installation/management methods have been described up to now.

Embodiments of the present disclosure suggest making an independent AI program, which provides an enhanced function, into a component, and implementing a mutual interface function for managing AI component data, which supports a plug-and-play associated with container-based virtualization technology, so as to efficiently respond to a virtual environment.

Accordingly, the efficiency of driving the AI component functions can be maximized, an interface for optimizing the performance of AI components in the virtual environment can be realized, and real-time processing through execution priorities of the AI components and QoS supporting can be achieved.

Hereinafter, a method for remotely calling an AI component will be described.

Figure 5:
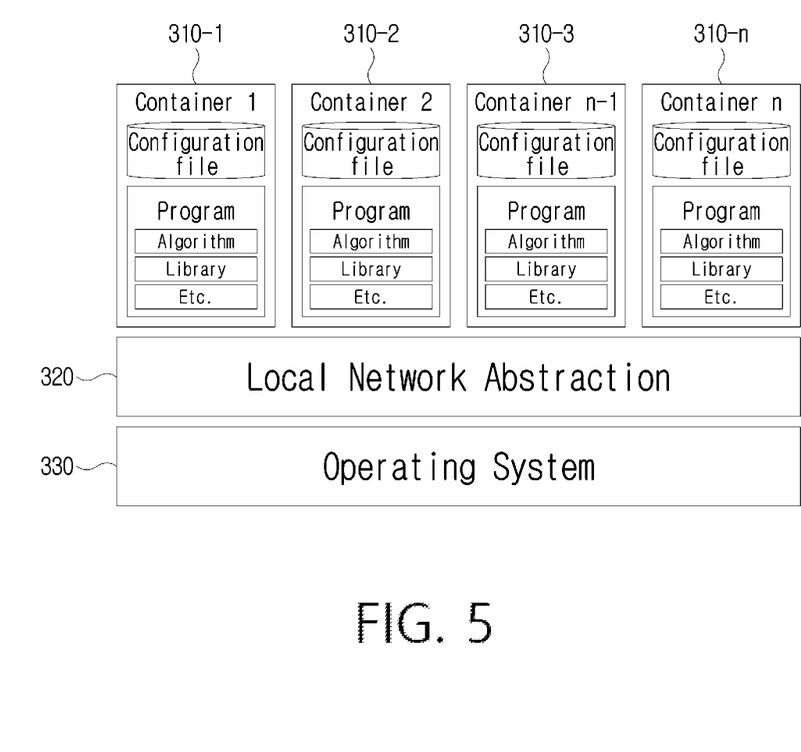
FIG. 5 is a view illustrating a structure of a container-based virtualization system.

FIG. 5 is a view illustrating a structure of a container-based virtualization system. The container-based virtualization provides a virtual environment of a process execution method, differentied from the concept of a virtual machine having an independent operating system mounted therein, and further enhances stability and security of the system.

As shown in FIG. 5, the container-based virtualization system is established by including containers 310-1, 310-2, 310-3, and 310-n, a local network abstraction module 320, and an operating system 330.

The containers 310-1, 310-2, 310-3, and 310-n create resources which are isolated from one another according to users. The containers 310-1, 310-2, 310-3, and 310-n have their required internal programs installed therein, respectively.

The internal programs installed in the containers 310-1, 310-2, 310-3, and 310-n may be AI programs, which are operated independently and implement the AI functions capable of performing a plug-and-play, that is, the above-described AI components.

In addition to the AI components, programs of other types may be installed in the containers 310-1, 310-2, 310-3, and 310-n, and even in this case, the technical concept of the present disclosure can be applied.

The local network abstraction module 320 is a module for a communication interface of the containers 310-1, 310-2, 310-3, and 310-n in the virtual system.

Figure 6:
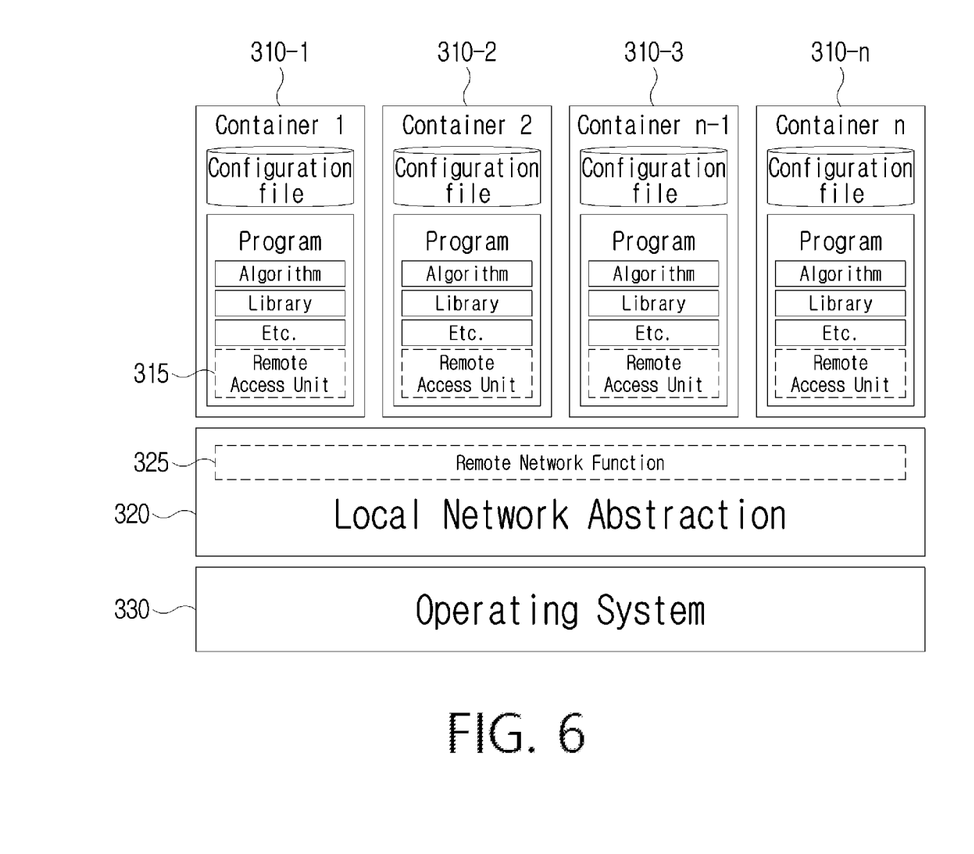
FIG. 6 is a view illustrating a virtualization system according to an embodiment of the present disclosure.

Hereinafter, a structure of a container-based virtualization system capable of remotely calling an internal program of a container will be described in detail with reference to FIG. 6. FIG. 6 is a view illustrating a virtualization system according to an embodiment of the present disclosure.

As shown in FIG. 6, in addition to internal programs (algorithms, libraries, etc.) of various purposes, remote access units 315 are installed in the containers 310-1, 310-2, 310-3, and 310-n.

The remote access units 315 enable external programs to call the internal programs of the containers 310-1, 310-2, 310-3, and 310-n, and to change or edit functions of the internal programs (for example, AI components).

The remote access unit 315 installed in the container-1 310-1 is for calling the internal program of the container-1 310-1, the remote access unit 315 installed in the container-2 310-2 is for calling the internal program of the container-2 310-2, the remote access unit 315 installed in the container-3 310-3 is for calling the internal program of the container-3 310-3, and the remote access unit 315 installed in the container-n 310-n is for calling the internal program of the container-n 310-n.

In addition, as shown in FIG. 6, a remote network function module 325 is provided in the local network abstraction module 320. The remote network function module 325 supports the external programs to access/interwork with the remote access units 315 of the containers 310-1, 310-2, 310-3, and 310-n.

Figure 7:
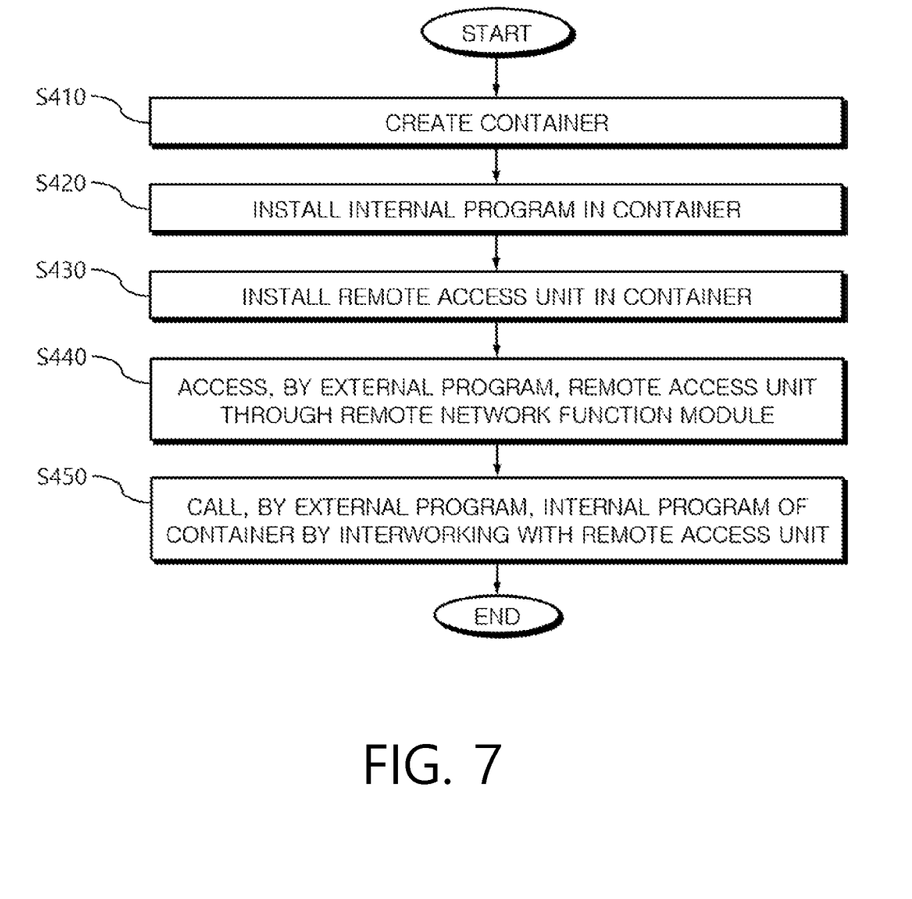
FIG. 7 is a flowchart provided to explain a container-based method for calling a program at a remote distance according to another embodiment of the present disclosure.

FIG. 7 is a flowchart provided to explain a container-based method for remotely calling a program according to another embodiment of the present disclosure.

As shown in FIG. 7, when a container is created (S410), an internal program (AI component) is installed in the container (S420), and a remote access unit is installed to be able to remotely call a program based on the container (S430).

The order of steps S420 and S430, that is, the order of installing the internal program and the remote access unit in the container, may be changed.

Then, an external program accesses the remote access unit of the container in which an internal program that the external program intends to call is installed through the remote network function module of the local network abstraction module (S440).

Thereafter, the external program calls the internal program of the container by interworking with the remote access unit (S450).

Meanwhile, the execution priority of the AI component called by the remote access unit can be increased. Furthermore, the execution priority of the AI component the function of which is changed or edited after being called can be further increased.

In other words, the execution priority of the AI component which is just called may be increased by one step, and the execution priority of the AI component the function of which is changed or edited after being called may be increased by two steps.

Preferred embodiments of the method for remotely calling the internal program (AI component) of the container have been described in detail up to now.

Embodiments of the present disclosure suggest the method for remotely function-calling various AI components which are operated independently and are capable of performing a plug-and-play, and, by this method, can maximize performance and efficiency of virtualization resources.

Figure 8:
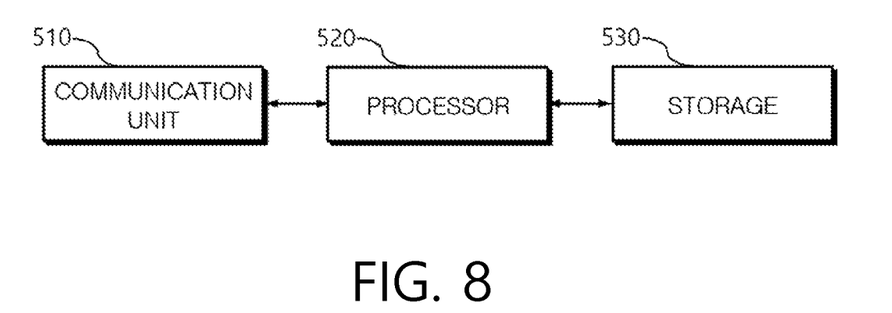
FIG. 8 is a view illustrating a hardware structure of a cloud server which can implement a virtualization system according to still another embodiment of the present disclosure.

FIG. 8 is a view illustrating a hardware structure of a cloud server which can implement a virtualization system according to still another embodiment of the present disclosure. As shown in FIG. 8, the cloud server includes a communication unit 510, a processor 520, and a storage 530.

The communication unit 510 may be for communicating with another server or an external terminal through a network, and the processor 520 configures/operates the above-described virtualization system, and in particular, performs procedures necessary for creating/managing AI components, and for remotely calling, changing, or editing. The storage 530 provides a storage space necessary for configuring/operating the virtualization system.

The technical idea of the present disclosure may be applied to a computer-readable recording medium which records a computer program for performing functions of the apparatus and the method according to the present embodiments. In addition, the technical idea according to various embodiments of the present disclosure may be implemented in the form of a computer-readable code recorded on a computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer-readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A container-based component management method within a virtualization system, the method comprising:
   creating a plurality of containers;
   installing at least one component selected from a plurality of components in each container of the plurality of containers;
   installing a remote access unit in the each container of the plurality of containers;
   setting execution priorities of components installed in the plurality of containers; and
   remotely calling, through a first remote access unit installed a first container among the plurality of containers, and a remote network function module installed in a local network abstraction module of the virtualization system, a component installed in the first container and changing an execution priority of the called component by an external program through the first remote access unit and the remote network function module.

2. The method of claim 1, wherein the remotely calling of the component comprises accessing the first remote access unit through the remote network function installed in the local network abstraction module of the virtualization system.

3. A virtualization system comprising:
   a docker configured to create a plurality of containers; and
   a manager provided in the docker and configured to
     install at least one component selected from a plurality of components in each container of the plurality of containers,
     install a remote access unit in the each container of the plurality of containers; and
     set execution priorities of components installed in the plurality of container,
   wherein a component installed in a first container among the plurality of containers is remotely called through a first remote access unit installed the first container and a remote network function module installed in a local network abstraction module of the virtualization system, and an execution priority of the called component is remotely changed by an external program through the first remote access unit and the remote network function module.

* * * * *